Figure 1:
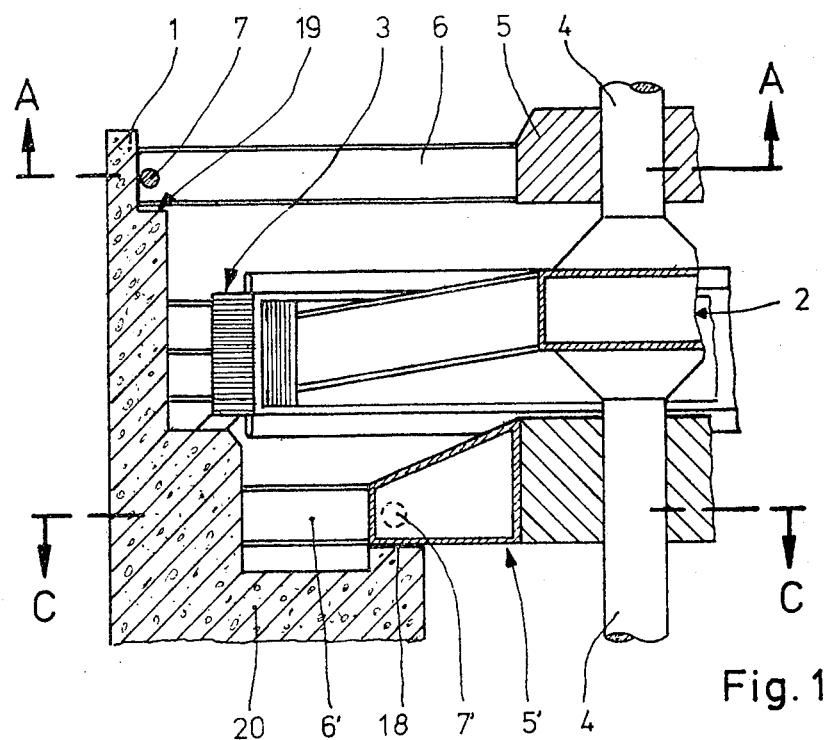

United States Patent [19]

Starcevic

[11] 4,258,280
[45] Mar. 24, 1981

[54] SUPPORTING STRUCTURE FOR SLOW SPEED LARGE DIAMETER ELECTRICAL MACHINES

[75] Inventor: Mihailo Starcevic, Mellingen, Switzerland

[73] Assignee: BBC Brown Boveri & Company Limited, Baden, Switzerland

[21] Appl. No.: 863,745

[22] Filed: Dec. 23, 1977

Related U.S. Application Data

[63] Continuation of Ser. No. 630,017, Nov. 7, 1975, abandoned.

[51] Int. Cl.³ .............................................. H02K 27/04
[52] U.S. Cl. .................................... 310/157; 310/91; 310/90; 310/258; 310/261
[58] Field of Search .................... 310/157, 254, 90, 91, 310/258, 259, 89, 261; 248/7, 26

[56] References Cited

U.S. PATENT DOCUMENTS

| | | | |
|---|---|---|---|
| 2,792,505 | 5/1957 | Baudry | 310/157 |
| 2,936,141 | 5/1960 | Rapata | 248/26 |
| 3,272,444 | 9/1966 | Rich | 310/40 |
| 3,293,464 | 12/1966 | Spirk | 310/157 |
| 3,317,166 | 5/1967 | Janssen | 248/26 |
| 3,361,914 | 1/1968 | Janssen | 248/26 |
| 3,387,152 | 6/1968 | Mücke | 310/157 |
| 3,742,271 | 6/1973 | Whiteney | 310/91 |
| 3,803,434 | 4/1974 | Tamatsukuri | 310/157 |
| 3,935,490 | 1/1976 | Spirk | 310/157 |
| 4,060,744 | 11/1977 | Starcevic | 310/157 |

Primary Examiner—R. Skudy
Attorney, Agent, or Firm—Burns, Doane, Swecker & Mathis

[57] ABSTRACT

A supporting structural component such as a bearing for the rotor of a slow speed large diameter electrical machine the rotor of which rotates about a vertical axis comprises concentric inner and outer rings joined by rigid rectilinear spoke-like connecting elements spaced uniformly around the circumference. The arrangement of these connecting elements is such that they are tangent to the surface of an imagined coaxial cylinder the diameter of which is smaller than that of the inner ring, and the axes of two neighboring connecting elements when imagined as extended in a straight line over both rings intersect only within the inner ring. The connecting elements are inflexible over their whole effective length in the longitudinal direction corresponding to the applied load. Also, the respective axes of all of the spoke-like connecting elements lie at identical acute angles and in the same sense to radii of the inner and outer rings.

17 Claims, 7 Drawing Figures

U.S. Patent   Mar. 24, 1981   Sheet 3 of 3   4,258,280

SUPPORTING STRUCTURE FOR SLOW SPEED LARGE DIAMETER ELECTRICAL MACHINES

This is a continuation of application Ser. No. 630,017, filed Nov. 7, 1975, now abandoned.

The invention concerns components of the supporting structure of electrical machines such as generators or motors which are at least of approximately rotationally symmetrical form and consist of at least two rings arranged concentrically to each other by way of a number of spoke-like connecting elements.

Supporting structure components of this kind are known predominantly in conjunction with slow-running, large diameter, electrical machines of vertical construction (Swiss Pat. No. 440,435), their purpose being to transmit forces of whatever nature directly to the foundation. The outer concentric ring is usually the generator pit, built as a concrete ring, and the inner ring is formed by the bearing housing surrounding the machine bearing, this housing being also the central body for the bearing support. The latter comprises a number of spoke-like connecting elements which in a known arrangement extend radially. Particularly in the case of machines of large dimensions this gives rise to problems which are difficult to solve, as described in the following example.

Consider an arrangement of the guide bearing according to FIG. 1 of the accompanying drawings to be described below, with the following data and dimensions:

Outside diameter of bearing housing: 4 m
Diameter of concrete pit: 16 m
Number of radial arms in bearing support: 12
Nature of arms: beams IPB 1,000

A change in temperature of only 10° C. acting on the arms gives rise to a compressive load of about 100 t per arm, which means that forces of 12×100 t act radially outwards around the circumference of the concrete, creating in it tangential tensile stresses which are harmful to the concrete. These same forces naturally also press on the bearing housing, seriously endangering the already small bearing clearance of about 0.3 mm.

With the known solutions, the relative expansion of the components is achieved either by making the connecting elements resilient in the radial direction or by allowing them to move radially. If the resilience is increased the central shaft guide is inadequate, while with radial freedom of movement the very connecting element which is not anchored, for example when using radial keyways, is the one positioned at right angles to the direction of the applied force, and hence subjected to the greatest load. Moreover, the known solutions are very costly.

The object of the invention is to avoid the disadvantages states above and devise a rigid construction which can transmit axial, radial and tangential forces, allows concentric expansion of the rings in the event of both symmetrical and asymmetrical loads, and is subject to only small expansion forces.

This object is achieved in that the connecting elements are tangents to the surface of an imagined coaxial cylinder the diameter of which is smaller than that of the inner ring, that the axes of two neighbouring connecting elements when imagined as extended in a straight line over both rings intersect only within the inner ring, and that the connecting elements are inflexible over their whole effective length in the longitudinal direction corresponding to the applied load.

The advantage of the invention lies particularly in the fact that all components are completely free to expand concentrically without the use of resilient radial elements, such as springs for example. This allows simpler and less expensive constructions.

If the connecting elements are fixed to at least one of the rings by means of hinged joints, the thermal expansion forces exerted on the rings by the connecting elements are almost completely eliminated, and so the ring can be of lighter construction. In addition, a hinged form of attachment has important advantages over a rigid fixing as regards assembling and dismantling the components.

It is of advantage if the anchoring points of at least one of the rings are joined with tie bars for purposes of stiffening. If these bars are adjustable in length, any desired pre-stress can easily be exerted on the rings. This construction, which thus behaves as a truss, is extremely stiff and light.

In the case of machines of large dimensions it is recommended that the connecting elements should be divided into a number of sections, pairs of these brought together at junctions points, and the latter linked to each other by cross-braces. As this reduces the unsupported length of the connecting elements, these can be made considably lighter. At least the load-bearing cross-section of the various sections can be matched to the respective loading.

Figure 2:
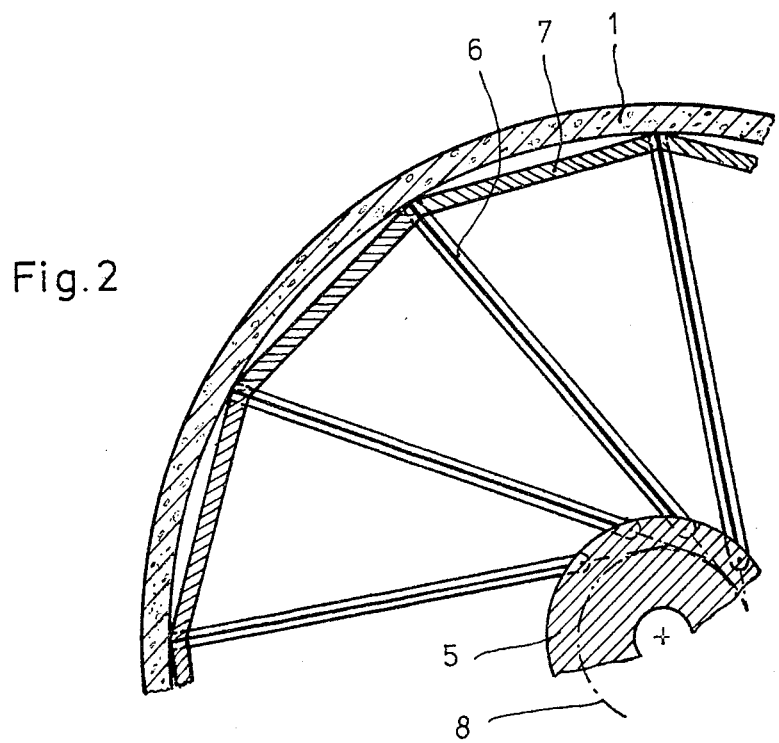
Figure 3:
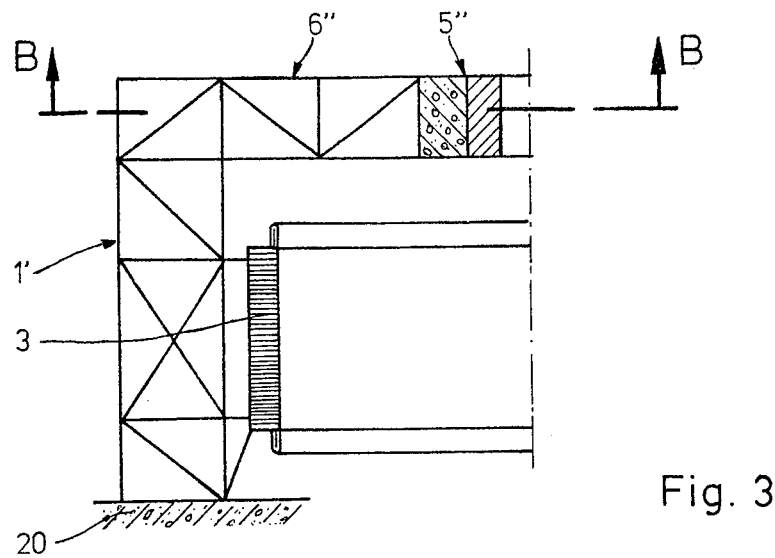
Figure 4:
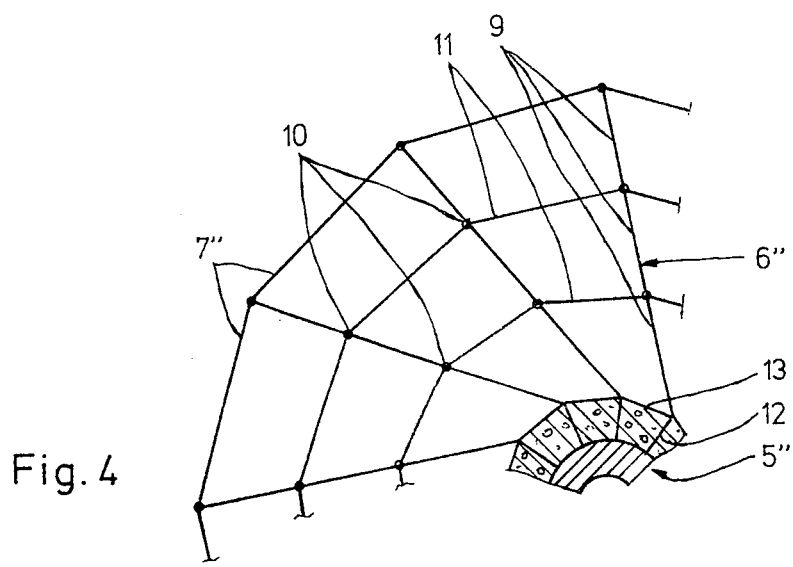
Figure 5:
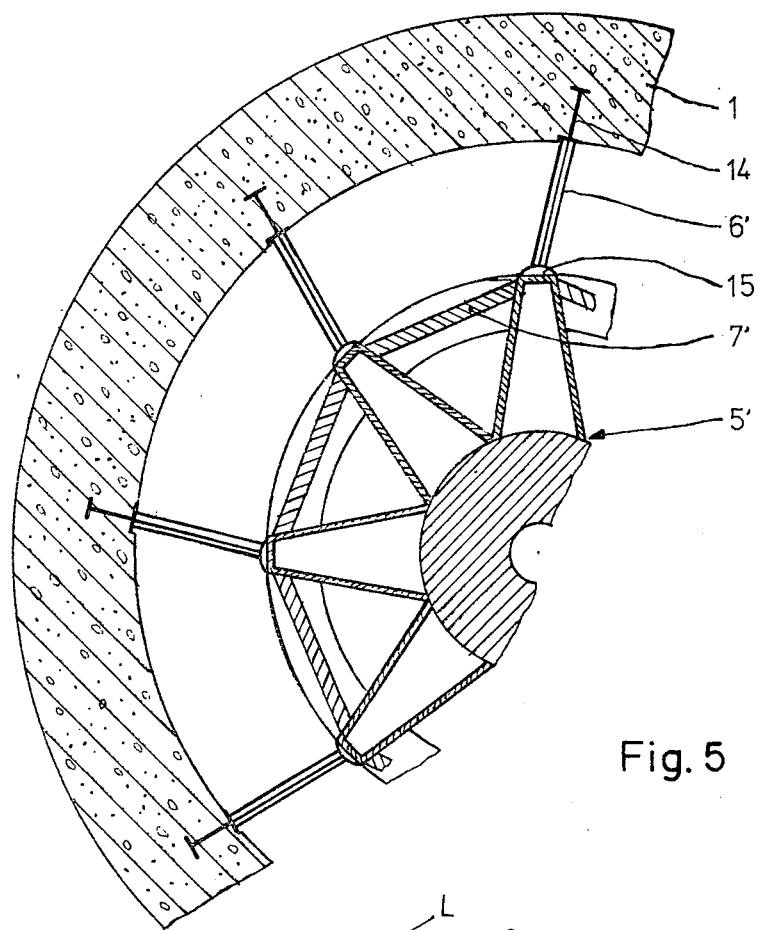
Figure 6:
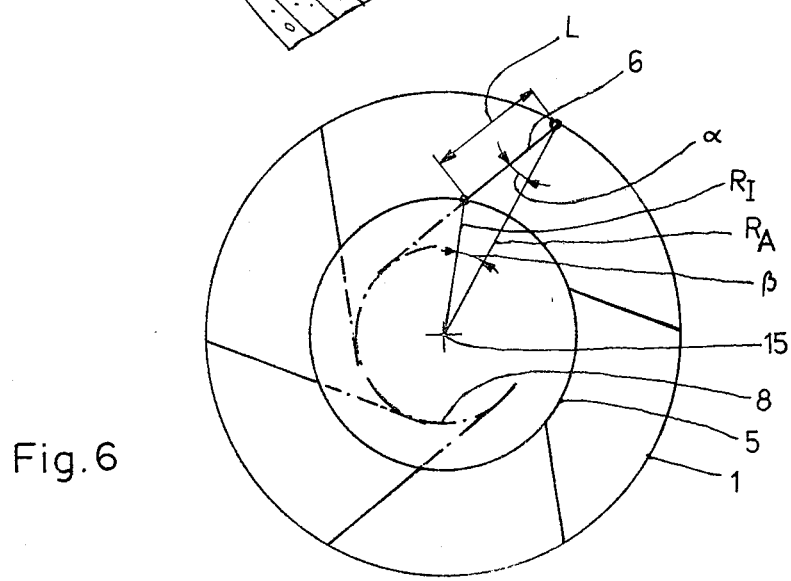

The invention is explained in the following by means of examples with reference to the drawings, in which:

FIG. 1 shows part of an axial section through an electrical machine of vertical construction and through its surrounding concrete shell, FIG. 2 is a partial section of the arrangement shown in FIG. 1 along the line A—A, FIG. 3 is a partial axial section through the supporting structure of a free-standing machine, FIG. 4 shows schematically a partial section through the arrangement of FIG. 3 along the line B—B, FIG. 5 is a partial section of the arrangement shown in FIG. 1 along the line C—C, and FIG. 6 is a schematic representation of the components to illustrate the principle of the invention.

Identical components are provided with the same reference symbols in all the figures.

According to FIG. 1 the outer ring 1 of the considered components is a concrete ring arranged on a concrete foundation 20, the ring serving to support the electrical machine comprising essentially the rotor 2 rotatable about a vertical axis and stator 3, and also its guide bearing and thrust bearing, which are not described in further detail.

The guide bearing, the purpose of which in the example shown is solely to guide the rotor shaft 4 in the radial direction, is supported by way of a guide spider consisting of a central body and beam arms, the central body comprising the inner ring 5, and the arms the connecting elements 6. Tie bars 7 join the anchorage function points of the arms to the concrete ring 1.

The thrust-bearing spider consists of the central body, containing the thrust bearing (not shown), and a number of rectilinear arms in the form of sectional beams or box beams which support and align the central body. Within the terms of the invention the polygonal thrust-bearing spider is inner ring 5' coaxial with the inner ring 5. At the ends of the arms the vertical forces from the thrust bearing are transmitted direct to the foundation 20 through the bearing surface 18, which is only indicated. Tie bars 7' join the rectilinear arms at their ends, which form the anchorage points for the beams comprising connecting elements 6'. The latter transmit the forces, whether they be thermal expansion forces, forces due to rotor imbalance or forces caused by magnetic pull, to the concrete foundation 20. Both the connecting elements 6 from the guide bearing and the connecting elements 6' from the thrust bearing comprise components which are rigid and inflexible in the longitudinal direction in accordance with forces acting on them.

FIG. 2 shows a cross-section through the arrangement of FIG. 1 at line A—A. The connecting elements 6 if extended, are tangents to the surface of a coaxial cylinder 8 within the ring 5 and indicated by a chain-dotted line. In other words, the connecting elements 6 form acute angles with lines tangent to a circle at the respective junction points of the rigid arms with the inner ring 5. The hinged attachment of the arms to the central body at second respective junction points is indicated schematically. The elements 6 form a first acute angle with the inner ring 5 which is greater than a second acute angle formed by line tangent to the inner ring 5 at the second respective junction points. The arms are located in an annular recess 19 (FIG. 1) in concrete ring 1 and can be fixed at first respective junction points in any manner desired. A defined tangential compressive load can be exerted on the concrete ring by means of the adjustable tie bars 7 which are fixed to the outer anchorage points of connecting elements 6. These tie bars 7 can be round bars with left and right-hand threads at the ends, for example, with which a pre-stress can be applied to the outer ring 1 which persists under all operating conditions.

FIG. 3 shows an arrangement which is of advantage with machines of very large dimensions. This is a free-standing machine which has no concrete ring or concrete pit. The bearing spider and the stator 3 are supported on a truss construction which forms the outer ring 1'. With constructions of this kind there is no need for the otherwise customary lightweight steel machine housing, which is replaced by a steel enclosure mounted direct on the frame, giving it the necessary stiffness and the present example consisting of the tie bars 7". The inner ring 5" is composed of the central body comprising a steel reinforced-concrete structure, and the connecting elements 6" are frame girders.

FIG. 4 shows a partial cross-section of the arrangement in FIG. 3 at the line B—B. To reduce the unsupported length, the connecting elements 6" are divided into several sections 9 and joined together at junction points 10. The latter are joined to each other by cross-braces 11. The central body of the guide spider can be of concrete to increase its dynamic stiffness or, as shown, the spaces between the radial elements 12 and transverse elements 13, which form closed boxes, can be filled with concrete, whereupon this assembly forms the ring 5". In this way the bearing support can be assumed to be completely rigid, even with machines of very large dimensions.

FIG. 5 shows a further example of the invention, being a cross-section at line C—C of the arrangement in FIG. 1. The central body of the thrust-bearing spider is provided with eight arms, the spider as a whole forming the ring 5'. Ring 1 corresponds to the concrete foundation. The connecting elements 6', in accordance with the invention, are spokes in the form of profiled or box beams which at one end are anchored at third respective junction points to I-beam columns 14 cast in the concrete ring, while at the other end the arms are fixed by bolting, welding or hinged joints at fourth respective junction points. A hinged joint 15 at the ends of the arms is indicated in the present example. The tie rods 7' are round bars of adjustable length, their purpose being to stiffen and pre-stress the structure at fourth respective junction points —has been inserted; line 19, after "structure", —the connecting elements 6' are oriented similarly to the connecting elements 6 (FIG. 2), i.e., the elements 6' form a third acute angle with the inner ring 5' which is greater than fourth acute angle formed by a line tangent to the inner ring 5' at the fourth respective junction points.

The principle of the invention can be described with reference to the diagram of FIG. 6. The two concentric rings and the connecting elements are identified by the same reference symbols as the corresponding parts in FIGS. 1 to 5. The connecting elements 6 are tangents to the chain-dotted cylinder 8. Starting from the centre 16 of the system, $R_I$ is the radius of ring 5, $R_A$ that of ring 1, and the two radii form the angle $\beta$. $\alpha$ denotes the angle contained between $R_A$ and the considered connecting element 6, which has a length of L. For simplicity the angle $\gamma$ is introduced; this is the arithmetic sum of $\alpha$ and $\beta$. As is self-evident from FIG. 6, the arms 6 lie at identical acute angles in the same sense of rotation to radii of the concentric rings at the junction points of the arms with the rings.

Let one first consider symmetrical expansion $\Delta L$ of connecting elements 6, due to heat for example. This elongation is converted into a relative rotation of the two rings 1, 5, which is most conveniently expressed as a change in angle $\beta$.

$$\Delta \beta = \frac{\Delta L}{R_I \cdot \sin \gamma}$$

According to the object of the invention, expansion of the rings is required to be free and concentric under all load conditions. The following generally valid relationship can be written for both separate and combined changes of L, $R_I$ and $R_A$:

$$\Delta \beta = \frac{\Delta L}{R_I \cdot \sin \gamma} + \frac{\Delta R_I}{R_I \cdot \tan \gamma} - \frac{R_A \cdot \cos \alpha}{R_I \cdot \sin \gamma}$$

This relationship is valid when the fixings at both ends of the connecting elements 6 are hinged.

The forces acting at right angles to the machine axis are resolved into components which act in the direction of the axes of the connecting elements. As with a frame structure, the connecting elements are stressed only in tension or compression and consequently the assembly has great stiffness.

When the assembly is loaded symmetrically the ring-shaped parts remain concentric, both on expansion and contraction. With asymmetrical loading, for example heating of the connecting elements 6 on one side, the centre of the assembly could move eccentrically. This can be remedied by various means of adaptation, for instance by dimensioning the cross-sections in accordance with the forces which occur, by a suitable choice of materials, or in the case of individual connecting elements 6 by altering the angles α and β with appropriate modification of length L.

If the arrangement of FIG. 2, considered as representing the present state of the technology, is constructed in accordance with the invention, but with the connecting elements 6 rigidly fixed at both ends, and the cylinder 8 has a diameter of 3 m, the compressive loading of 100 t/bar exerted on the originally radial connecting elements can be reduced to 1 t/bar. If the anchorage points on one of the two rings, in FIG. 2 on the bearing housing for example, are provided with hinged joints, which by their nature do not transmit bending forces, none of the forces caused by the connecting elements are transferred to the rings.

If the connecting elements are rigidly fixed to the anchorage points they undergo slight bending owing to the relative rotation of the rings. The change of angle Δβ is somewhat smaller than with a hinged arrangement. Since the connecting elements are preferably of shaped profile with a relatively high moment of inertia, the ends can be solid, but must have a moment of inertia as small as possible about the bending axis. In this way, bending can be localized to the ends of the connecting elements. A particularly easy way of making these ends easily bendable is to use hollow sections for the connecting elements 6. Over their effective load-bearing length these have a cross-section with a relatively high moment of inertia; at the anchorage points the cross-section is pressed to a flat shape. The load-bearing cross-section then remains the same, while the moment of inertia about the bending axis is sharply reduced.

The invention is of course not restricted to what is shown in the drawings. The rings of the invention can be of polygonal or circular form, provided the anchorage points of each ring lie on a circle.

I claim:

1. An arrangement for mounting the stator and rotor of a rotary electrical machine of the vertical axis type having a form which is generally rotationally symmetrical, said arrangement comprising an outer ring rigid and fixedly secured and two axially spaced inner rings, said outer ring supporting the machine stator and said two axially spaced inner rings arranged concentrically within said outer ring and supporting the machine rotor, means for interconnecting said outer ring with each of said two axially spaced inner rings, said means for interconnecting including a plurality of rigid rectilinear arms which remain inflexible throughout their entire length when subjected to load, all of said rigid rectilinear connecting arms associated with one of said axially spaced inner rings forming identical acute angles both with respect to radial lines directed from the center of said one of said two axially spaced inner rings through respective junction points with said one of said two axially spaced inner rings and with respect to lines tangent to a circle at the respective junction points, said arms being inclined in the same rotational sense.

2. An arrangement as defined in claim 1 for mounting a rotary electrical machine including means for hingedly securing said rigid rectilinear arms to at least one of said inner and outer rings.

3. An arrangement as defined in claim 2 for mounting a rotary electrical machine further comprising a plurality of tie bars, adjacent junction points of said rigid rectilinear arms with at least one of said rings being joined together by a respective one of said tie bars.

4. An arrangement as defined in claim 3 for mounting a rotary electrical machine wherein each of said plurality of tie bars is adjustable in length.

5. An arrangement as defined in claim 1 for mounting a rotary electrical machine further comprising a plurality of cross braces, said rigid rectilinear arms being divided into a number of sections of which pairs of said sections are joined together at junction points, and the pair of sections are joined in circumferential directions at the junction points by the cross-braces.

6. An arrangement as defined in claim 1 wherein one of said inner rings forms part of a bearing housing structure for the rotor of said rotary electrical machine.

7. An arrangement for mounting a generally rotationally symmetrical component of a rotary electrical machine of the vertical axis type, comprising:
an outer ring, said outer ring being rigid and fixedly secured;
a first inner ring arranged concentrically within the outer ring, said first inner ring supporting a rotor of said rotary electrical machine;
means for interconnecting said outer ring with said first inner ring including a plurality of rigid arms, each of the plurality of rigid arms having a first and a second end, the first end of each of the plurality of rigid arms being connected at a first respective junction point to the outer ring and the second end of each of the plurality of rigid arms being connected at a second respective junction point to the first inner ring, each of said plurality of the rigid arms defining a first acute angle with the first inner ring which first acute angle is greater than a second acute angle formed by a line tangent to the first inner ring at the second respective junction point, with all of the rigid arms being oriented similarly in the same rotational sense.

8. The arrangement of claim 7 wherein each of the plurality of rigid arms remains inflexible throughout its entire length when subjected to a load.

9. The arrangement of claim 8 wherein all of said first acute angles are substantially identical to one another.

10. The arrangement of claim 7 further comprising means for hingedly securing the plurality of rigid arms to the first inner ring.

11. The arrangement of claim 7, further comprising:
a second inner ring axially spaced relative to the first inner ring and arranged concentrically within the outer ring, said second inner ring further supporting the rotor of the rotary electrical machine; and
second means for interconnecting said outer ring with said second inner ring including a plurality of second rigid arms, each of the plurality of the second rigid arms having a first and a second end, the first end of each of the plurality of the second rigid arms being connected at a third respective junction point to the outer ring and the second end of each of the plurality of the second rigid arms being connected at a fourth respective junction point to the second inner ring, each of said plurality of the second rigid arms defining a third acute angle with the second inner ring which third acute angle is greater than a fourth acute angle formed by a line tangent to the second inner ring at the fourth respective junction point, with all of the rigid arms being oriented similarly in the same rotational sense.

12. The arrangement of claim 11 wherein the first and third acute angles are all substantially identical.

13. The arrangement of claim 11 wherein the second inner ring includes a thrust bearing for the rotor of the rotary electrical machine.

14. An arrangement for mounting a generally rotationally symmetrical component of a rotary electrical machine of the vertical axis type, comprising:
- an outer ring, said outer ring being rigid and fixedly secured;
- a first inner ring arranged concentrically within the outer ring, said first inner ring supporting a rotor of said rotary electrical machine;
- means for interconnecting said outer ring with said first inner ring including a plurality of rigid arms, each of the plurality of rigid arms having a first and a second end, the first end of each of the plurality of rigid arms being connected at a first respective junction point to the outer ring and the second end of each of the plurality of rigid arms being connected at a second respective junction point to the first inner ring, each of said plurality of the rigid arms defining a first acute angle with the first inner ring, which first acute angle is greater than a second acute angle formed by a line tangent to the first inner ring at the second respective junction point, with all of the rigid arms being oriented similarly in the same rotational sense; and
- a plurality of tie bars, each of said tie bars joining together a pair of adjacent rigid arms at a pair of adjacent first respective junction points on the outer ring.

15. The arrangement of claim 14 wherein each of the plurality of tie bars is adjustable in length.

16. The arrangement of claim 14 further comprising a plurality of cross braces for joining adjacent ones of the plurality of rigid arms together, said plurality of cross braces being arranged in circumferential directions.

17. An electrical machine of vertical construction comprising:
- a stator;
- a rotor;
- an outer ring foundation structure surrounding the stator;
- upper guide bearing means for supporting the rotor;
- lower thrust bearing means for further supporting the rotor;
- both bearing means together include central bodies forming a concentric inner ring structure and a plurality of circumferentially extending and uniformly distributed spoke-like arms, the spoke-like arms being located intermediate said inner ring structure and said outer ring foundation structure;
- means for joining opposite ends of said arms to said inner and outer ring structures with respective axes of said arms forming identical acute angles with radial lines extending respectively from the common center of said inner ring structure and said outer ring foundation structure through corresponding joints which join outer ends of said arms with said outer ring foundation structure;
- the axes of said arms also forming identical acute angles with lines tangent to a circle at corresponding joints with the inner ring structure;
- said arms being inflexible over their whole effective length in the longitudinal direction corresponding to the applied load; and
- all of said arms being inclined in the same rotational sense so as to accomodate torsional stresses imposed upon said inner ring structure caused by thermally induced expansion thereof.

* * * * *